United States Patent [19]
Taguchi et al.

[11] Patent Number: 6,116,364
[45] Date of Patent: Sep. 12, 2000

[54] HYBRID VEHICLE PROPULSION APPARATUS

[75] Inventors: Takashi Taguchi; Masashi Murata, both of Utsunomiya; Hirokazu Ohsaki, Kasama, all of Japan

[73] Assignee: Honda Giken Kogyo Kabushiki Kaisha, Tokyo, Japan

[21] Appl. No.: 09/151,027

[22] Filed: Sep. 10, 1998

[30] Foreign Application Priority Data

Sep. 12, 1997 [JP] Japan ..................................... 9-249216

[51] Int. Cl.⁷ ....................................................... B60K 1/00
[52] U.S. Cl. .......................... 180/65.2; 180/65.4; 180/165
[58] Field of Search ................................. 180/65.1, 65.2, 180/65.3, 65.4, 65.5, 65.6, 65.7, 65.8, 165

[56] References Cited

U.S. PATENT DOCUMENTS 4,770,276  9/1988  Takubo .

4,958,095  9/1990  Uchida et al. .

FOREIGN PATENT DOCUMENTS

| 37 37 192 A1 | 7/1988 | Germany . |
| 195 35 942 A1 | 4/1997 | Germany . |
| 9-156388 | 6/1997 | Japan . |

*Primary Examiner*—Richard M. Camby
*Attorney, Agent, or Firm*—Armstrong, Westerman, Hattori, McLeland & Naughton

[57] ABSTRACT

A housing of a motor generator is integrally coupled to an end of an internal combustion engine. The internal combustion engine includes an oil pan and a cylinder block which have arcuate stiffener ribs and radial stiffener ribs on end surfaces thereof for increased mechanical strength of the internal combustion engine. The motor generator has a housing that is directly coupled to the internal combustion engine with a relatively small number of parts.

16 Claims, 10 Drawing Sheets

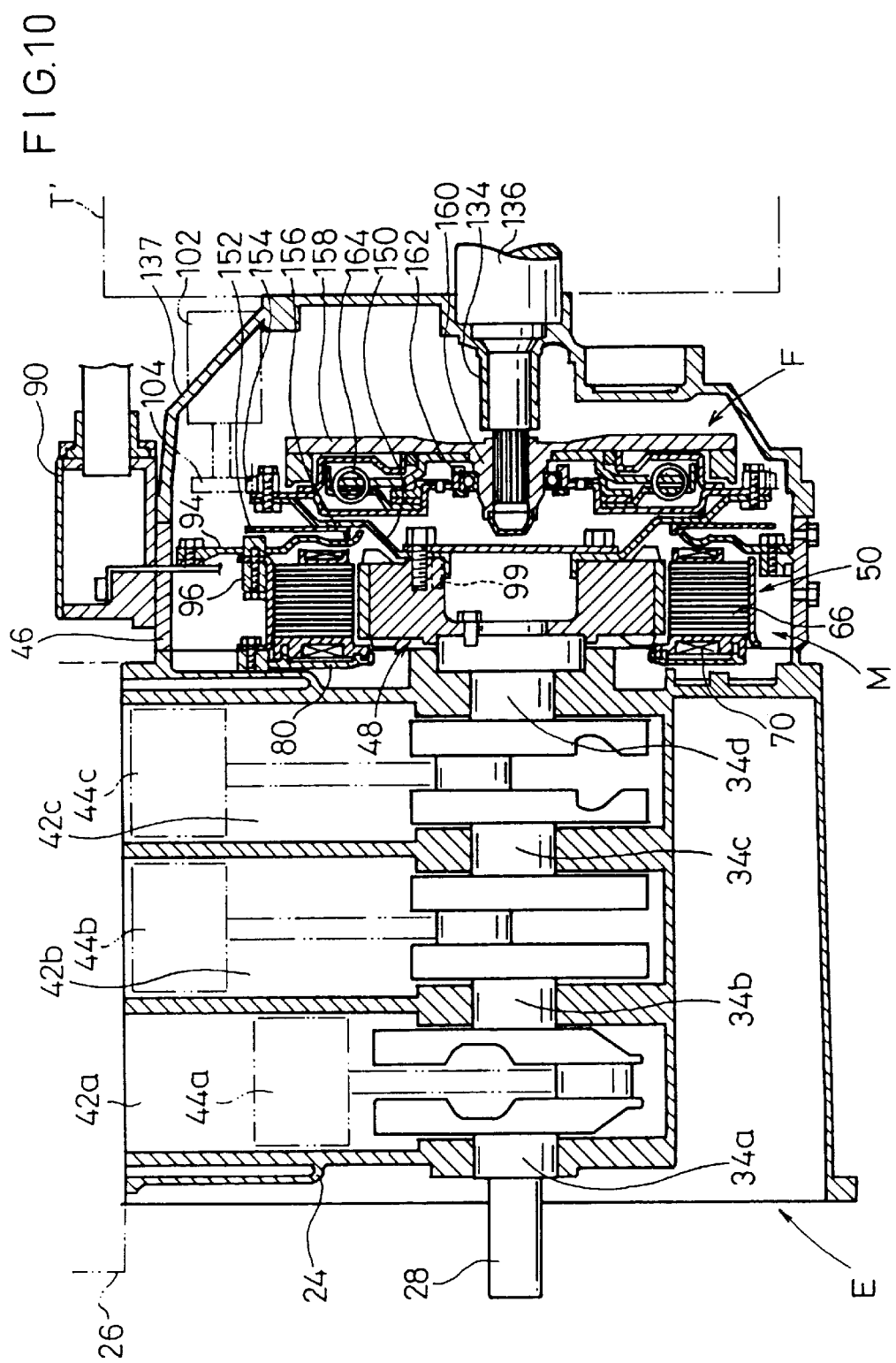

HYBRID VEHICLE PROPULSION APPARATUS

BACKGROUND OF THE INVENTION

1. Field of the Invention

The present invention relates to a hybrid vehicle propulsion apparatus comprising an internal combustion engine having an output shaft and a motor generator coupled directly to the output shaft.

2. Description of the Related Art

There has been proposed a hybrid vehicle having an internal combustion engine for generating propulsive forces by combusting gasoline and a motor generator which can be operated as an electric generator for regenerating electric energy and an electric motor for generating propulsive forces with electric energy to assist propulsive forces produced by the internal combustion engine. The propulsive forces produced by the internal combustion engine and the electric motor are combined as required to propel the vehicle. For details, reference should be made to Japanese laid-open patent publication No. 9-156388.

In the proposed hybrid vehicle, a transmission is coupled to the crankshaft of the internal combustion engine through a flywheel and a clutch mechanism, and the motor generator is coupled to a drive gear of the transmission.

The motor generator incorporated in the proposed hybrid vehicle is of a relatively large size. Therefore, since the motor generator is coupled to the drive gear of the transmission, the entire propulsion apparatus is considerably large in size. The large propulsion apparatus poses no essential problem if it is incorporated in largesize vehicles such as buses because their engine compartment usually has an enough space for the large propulsion apparatus. However, it is difficult to combine the proposed propulsion apparatus with small-size vehicles such as ordinary passenger cars due to their requirements for lightweight and compact designs.

Conventional internal combustion engines are associated with many accessories including a compressor, an oil filter, etc. The oil pan fitted beneath the crankcase of an internal combustion engine is shaped in view of the layout of those accessories. If a motor generator, a clutch mechanism, etc. are connected to the internal combustion engine, then a connector such as a bracket is needed to couple the oil pan to the housing of the motor generator. As a result, the number of parts used is increased.

SUMMARY OF THE INVENTION

It is a general object of the present invention to provide a hybrid vehicle propulsion apparatus which is made up of a relatively small number of parts and is relatively compact in its entirety.

Another object of the present invention is to provide a hybrid vehicle propulsion apparatus which includes an internal combustion engine that is sufficiently high level of mechanical strength.

Still another object of the present invention is to provide a hybrid vehicle propulsion apparatus having an internal combustion engine and a motor vehicle which have a common unitary housing for increased overall rigidity of the hybrid vehicle propulsion apparatus.

Yet still another object of the present invention is to provide a hybrid vehicle propulsion apparatus which is capable of appropriately distributing forces applied to an oil pan and a cylinder block for further increased overall rigidity of the hybrid vehicle propulsion apparatus.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a vertical cross-sectional view of a hybrid vehicle propulsion apparatus according to another embodiment of the present invention.

DETAILED DESCRIPTION OF THE PREFERRED EMBODIMENTS

Figure 1:
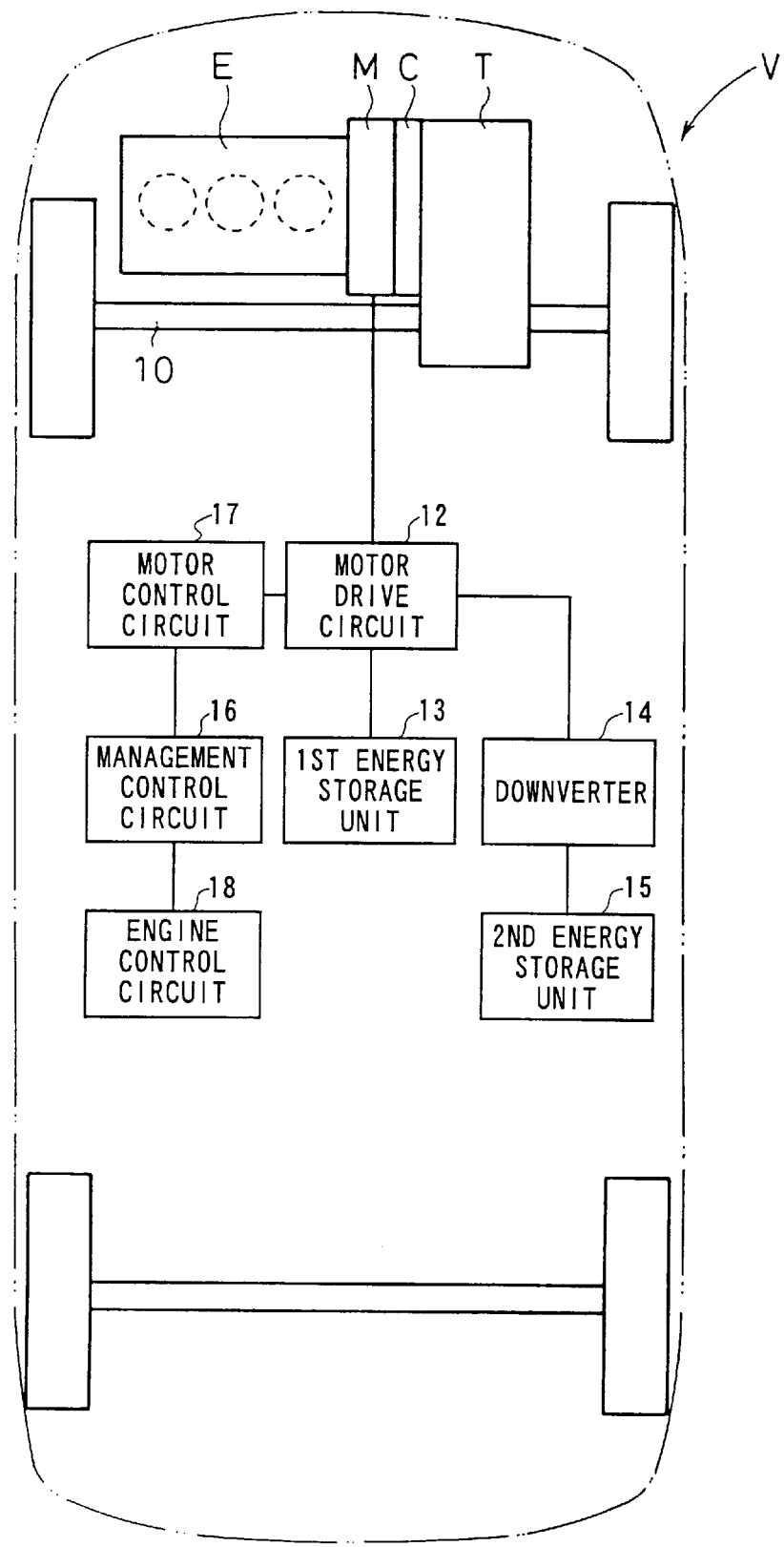
FIG. 1 is a schematic plan view, partly in block form, of a hybrid vehicle which incorporates a hybrid vehicle propulsion apparatus according to an embodiment of the present invention.

FIG. 1 schematically shows in plan a hybrid vehicle V which incorporates a hybrid vehicle propulsion apparatus according to an embodiment of the present invention.

As shown in FIG. 1, the hybrid vehicle V has an internal combustion engine E for generating propulsive forces by combusting gasoline, a motor generator M which can be operated as an electric generator for regenerating electric energy and an electric motor for generating propulsive forces with electric energy to assist propulsive forces produced by the internal combustion engine E, a clutch mechanism C, and also to a transmission T for selecting and transmitting the propulsive forces to a drive axle 10.

The motor generator M is controlled by a motor drive circuit 12 which is connected to a first energy storage unit 13 comprising a capacitor, for example, for supplying and storing high-voltage electric energy, and a downverter 14 that is connected to a second energy storage unit 15 for storing electric energy. The hybrid vehicle V also has a management control circuit 16 connected to a motor control circuit 17 for controlling the motor generator M through the motor drive circuit 12, and also to an engine control circuit 18 for controlling the internal combustion engine E.

The internal combustion engine E, the motor generator M, the clutch mechanism C, and the transmission T will be described below.

Figure 2:
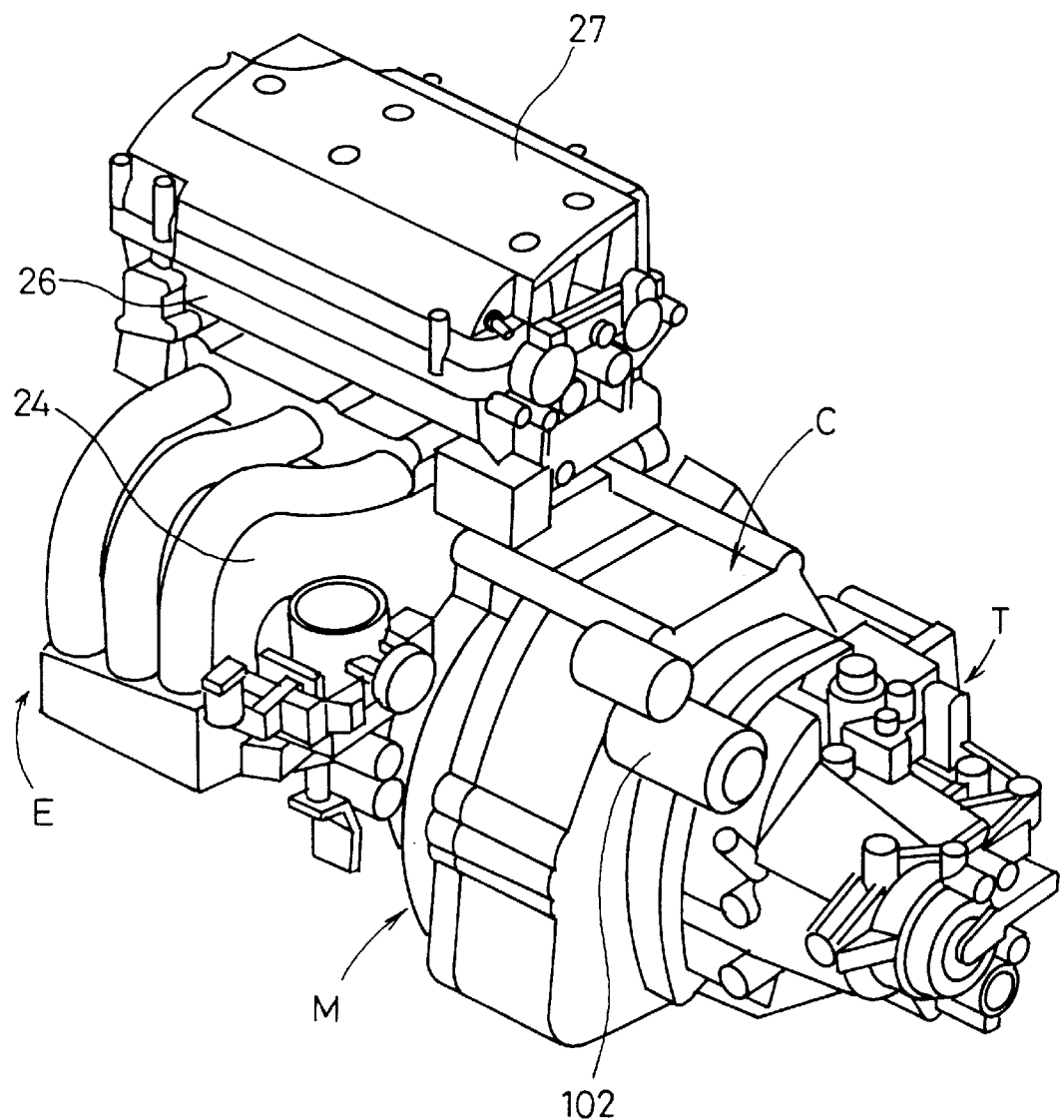
FIG. 2 is a perspective view of the hybrid vehicle propulsion apparatus.
Figure 3:
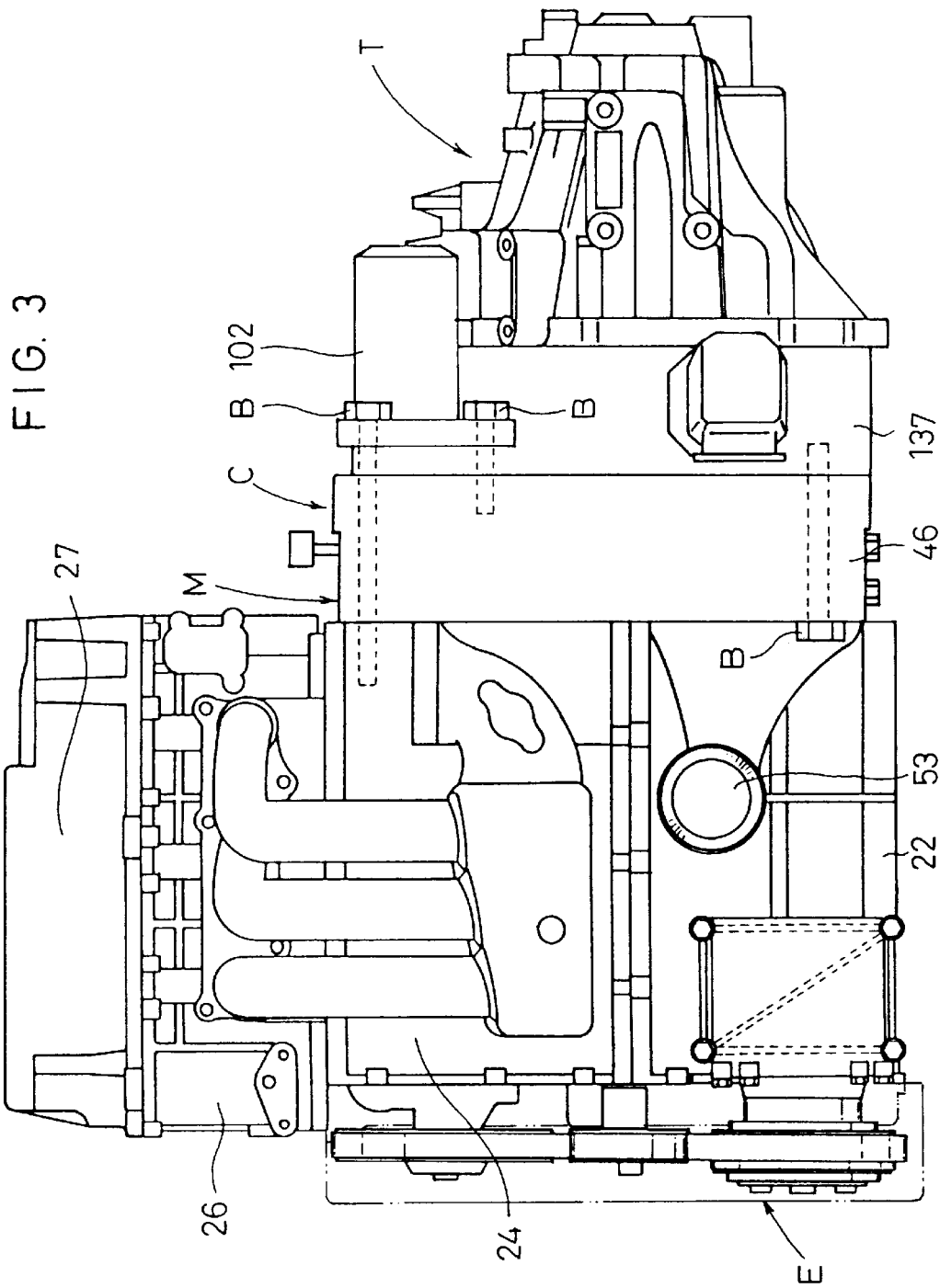
FIG. 3 is a side elevational view of the hybrid vehicle propulsion apparatus.
Figure 4:
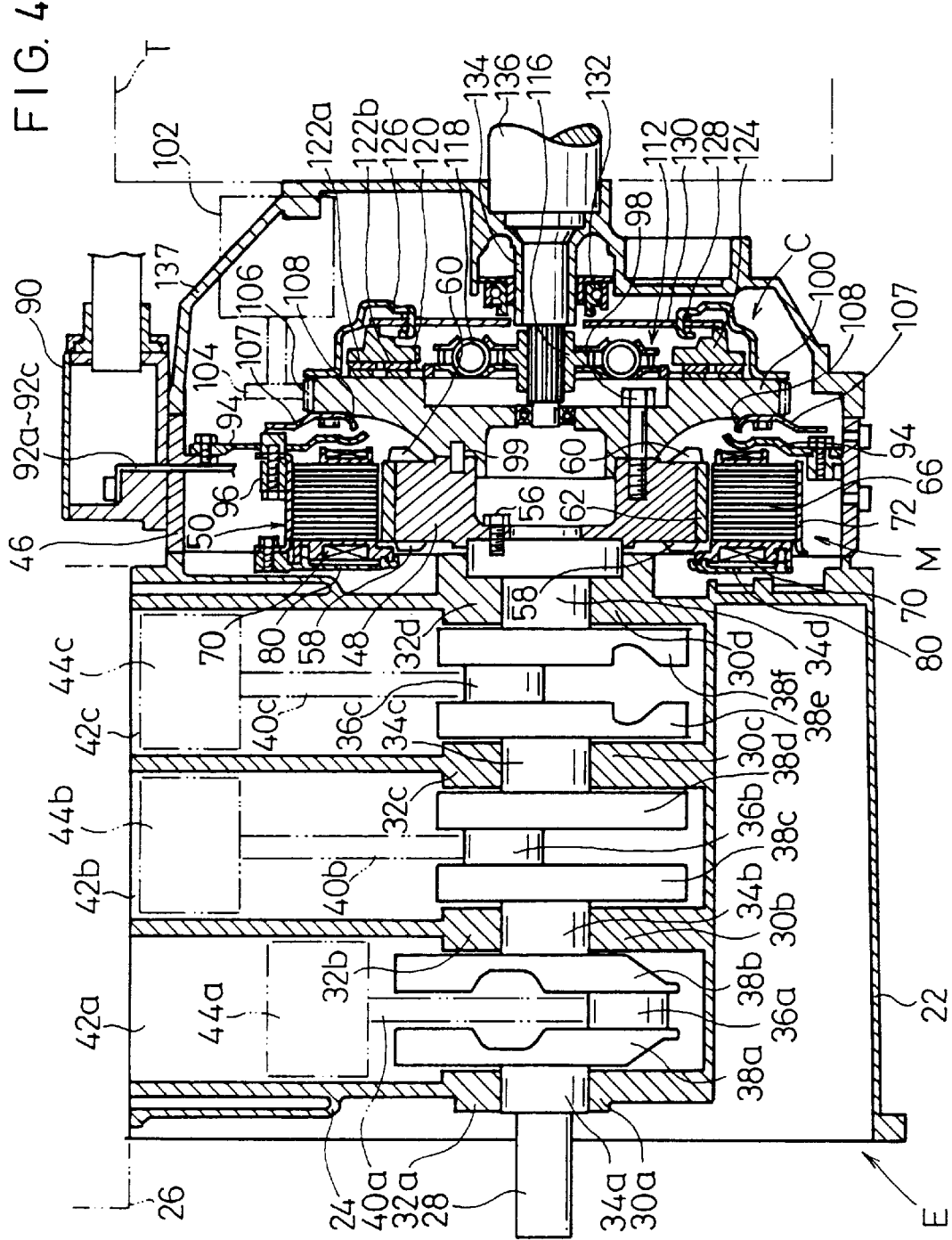
FIG. 4 is a vertical cross-sectional view of the hybrid vehicle propulsion apparatus.

FIGS. 2 through 4 show the hybrid vehicle propulsion apparatus which is designed for use on a manual-transmission hybrid vehicle. The internal combustion engine E, which is a three-cylinder engine, comprises an oil pan 22, a cylinder block 24, and a cylinder head 26 with a head cover 27 mounted on the top thereof. The oil pan 22 and the cylinder block 24 are joined to each other through a plurality of journal bearings 30a–30d, 32a–32d of a crankshaft 28. The crankshaft 28 comprises a plurality of journals 34a–34d, a plurality of crankpins 36a–36c, and a plurality of counterweights 38a–38f. The journals 34a–34d are rotatably supported by the journal bearings 30a–30d, 32a–32d. Connecting rods 40a–40c have respective ends operatively coupled to the crankpins 36a–36c, respectively. Pistons 44a–44c are connected to respective other ends of the connecting rods 40a–40c for sliding displacement in and along cylinders 42a–42d that are defined in the cylinder block 24.

The motor generator M and the clutch mechanism C are accommodated in a housing 46 which is joined to an end of the internal combustion engine E.

Figure 5:
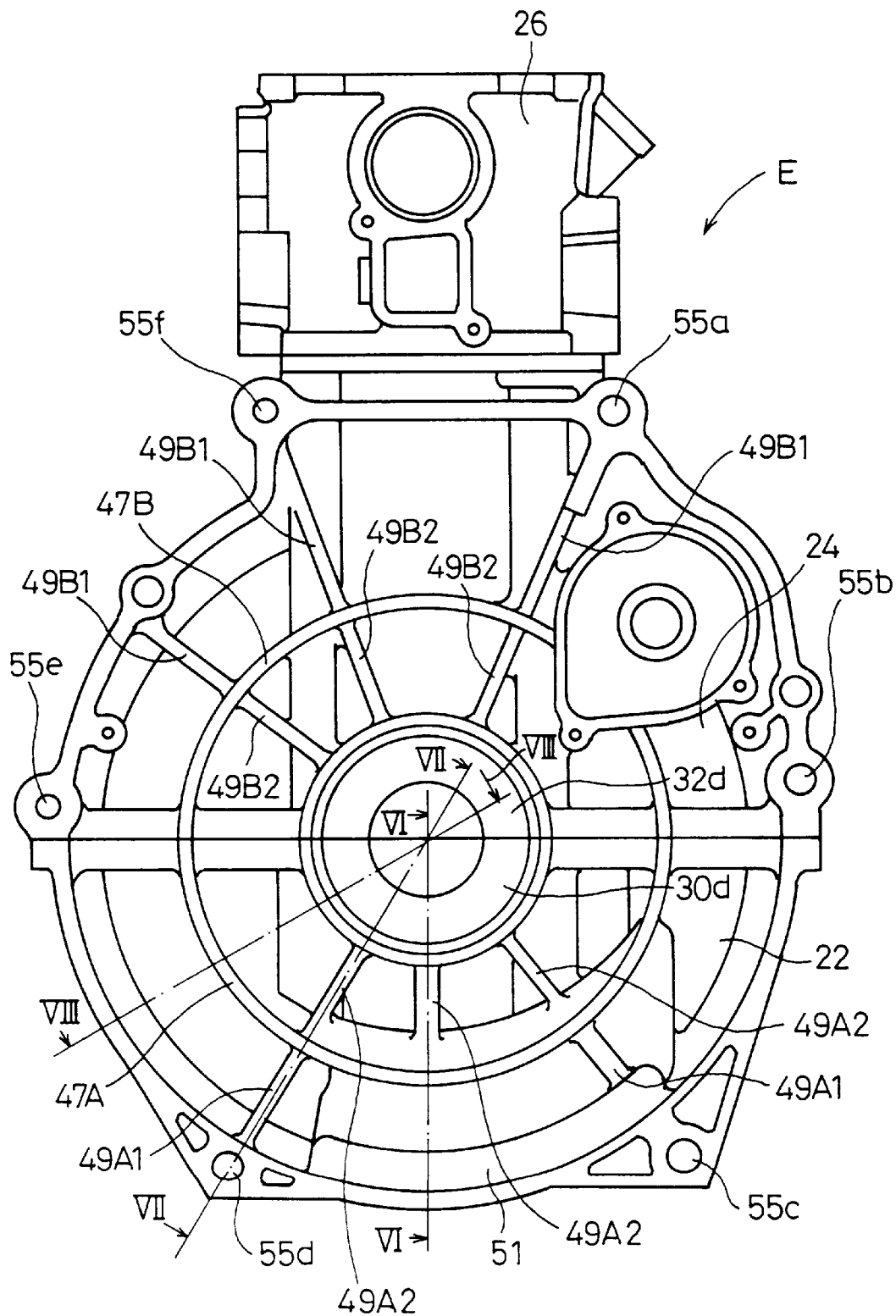
FIG. 5 is an elevational view of an end of an internal combustion engine as viewed from a motor generator of the hybrid vehicle propulsion apparatus.
Figure 6:
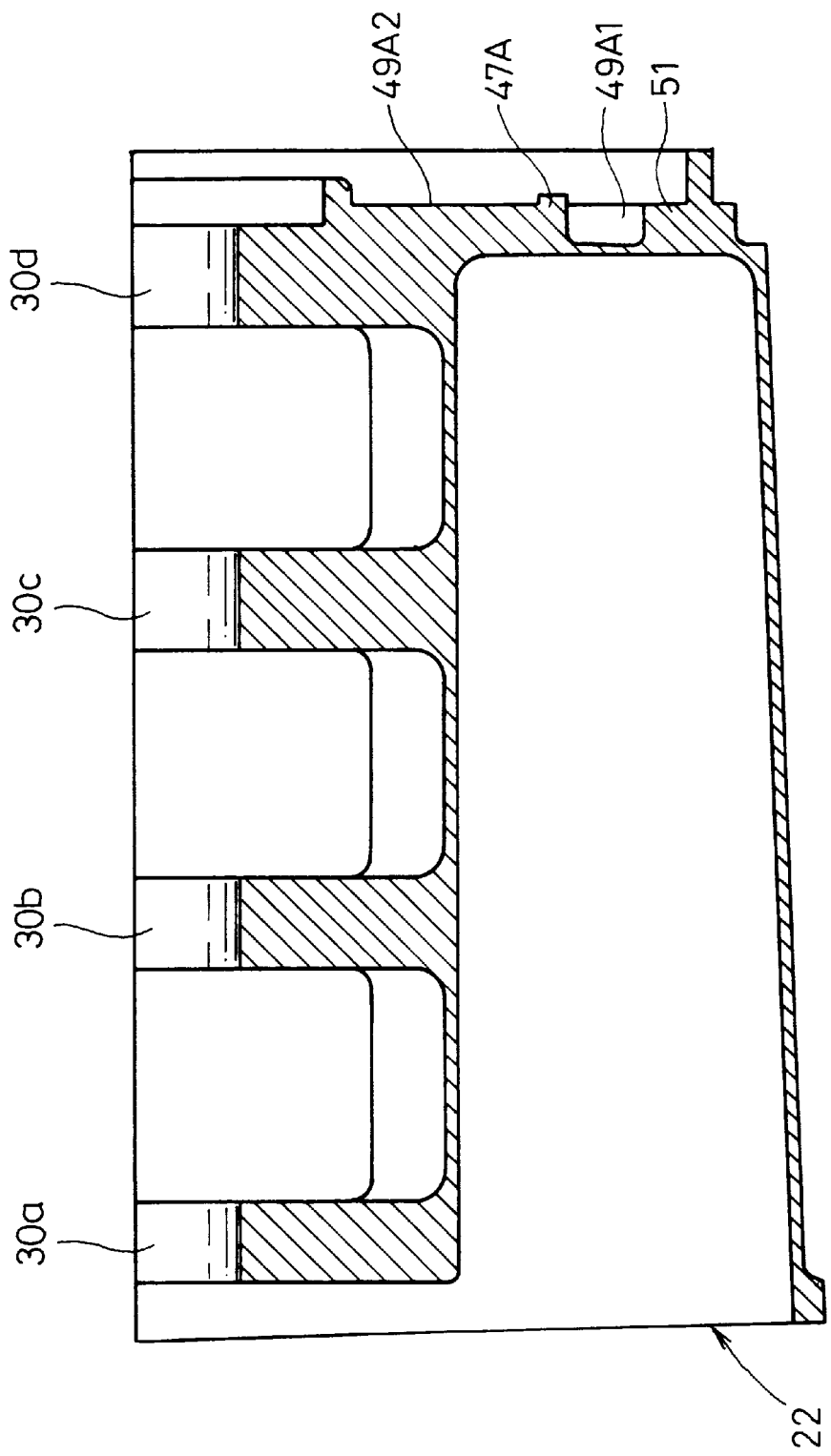
FIG. 6 is a cross-sectional view of an oil pan, taken along line VI—VI of FIG. 5.
Figure 7:
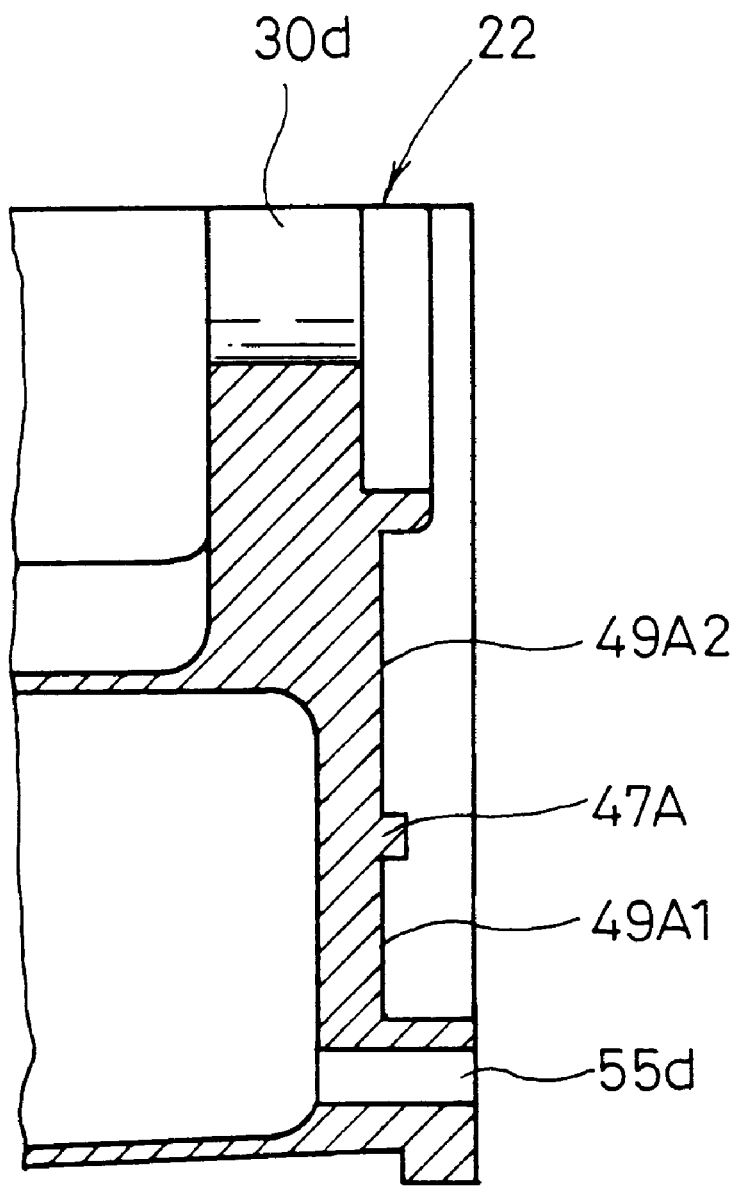
FIG. 7 is a cross-sectional view of the oil pan, taken along line VII—VII of FIG. 5.
Figure 8:
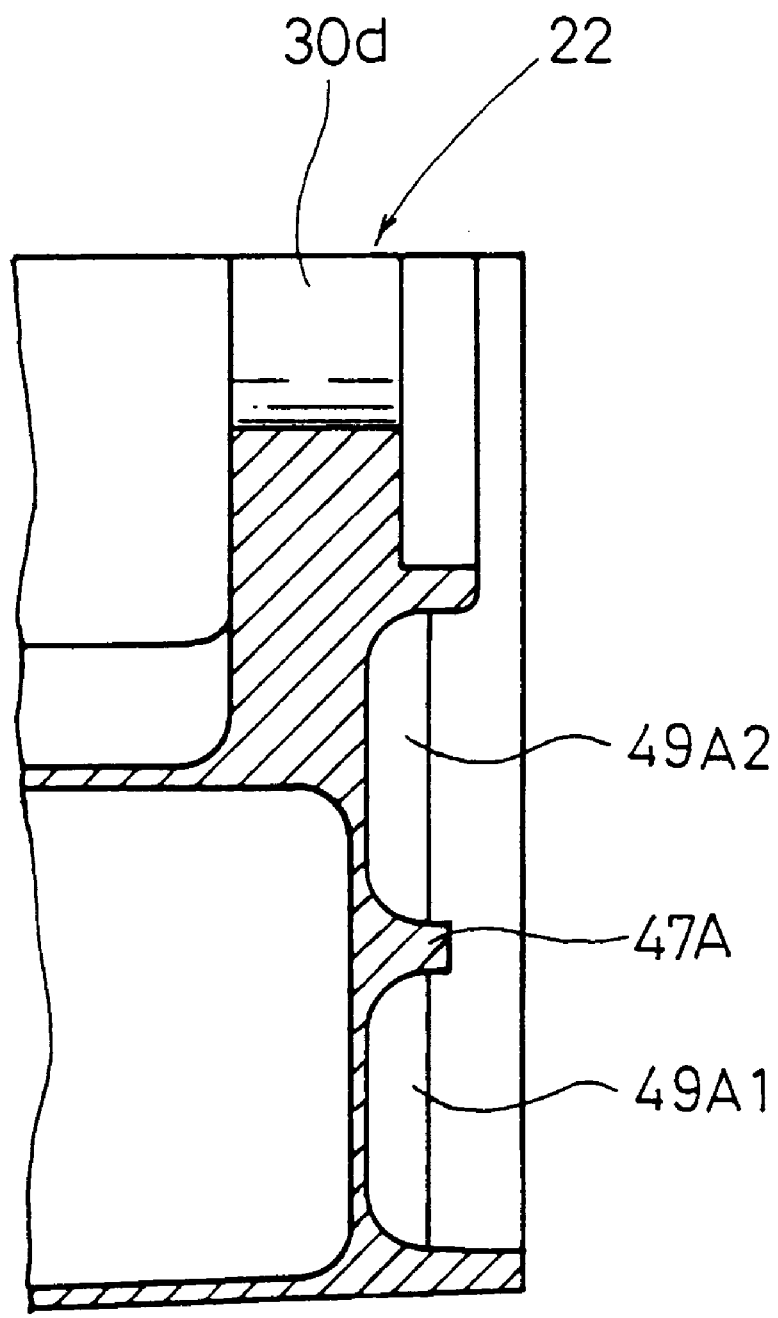
FIG. 8 is a cross-sectional view of the oil pan, taken along line VIII—VIII of FIG. 5.

FIG. 5 shows an end of the internal combustion engine E as viewed from the motor generator M. FIGS. 6 through 8 show the oil pan 22 in cross section.

As shown in FIGS. 5 through 8, the oil pan 22 and the cylinder block 24 have a pair of respective arcuate stiffener ribs 47A, 47B disposed on outer end surfaces of the journal bearings 30d, 32d around an axis of the crankshaft 28 and a plurality of radial stiffener ribs 49A1, 49A2, 49B1, 49B2 disposed on the outer end surfaces of the journal bearings 30d, 32d and extending radially outwardly from the journal bearings 30d, 32d, i.e., the axis of the crankshaft 28. The oil pan 22 also has an arcuate stiffener rib 51 on a lower outer end surface thereof. In order for the oil pan 22 to be directly coupled to the housing 46, the oil pan 22 has an end portion expanded outwardly from near a region where an oil filter 53 is mounted on the oil pane 22, as shown in FIG. 3. The oil pan 22 and the cylinder block 24 also have a plurality of bolt holes 55a–55f (see FIG. 5) defined in their outer circumferential edges facing the housing 46, so that the oil pan 22 and the cylinder block 24 can be fastened to the housing 46 by bolts through the bolt holes 55a–55f. According to a modification, the oil pan 22 may have an extension projecting toward the housing 46 and serving as part of the housing 46.

Mounting bolts B are inserted from the internal combustion engine E and threaded through the bolt holes 55a, 55b, 55c, 55d and the housing 46 into the transmission T, and mounting bolts B are inserted from the transmission T and threaded through the housing 46 and the bolt holes 55e, 55f into the internal combustion engine E. The housing 46, the cylinder block 24, and the oil pan 22 are thus directly coupled to each other by the mounting bolts B without any connectors interposed therebetween. Since the internal combustion engine E has the stiffener ribs 47A, 47B, 49A1, 49A2, 49B1, 49B2, the oil pan 22 has sufficient mechanical strength even though its end portion is expanded outwardly. Furthermore, the mounting bolts B which extend through the bolt holes 55e, 55f also serve to fasten a starter motor 102 (see FIG. 3). Therefore, no dedicated connectors and bolts are required to install the starter motor 102.

Figure 9:
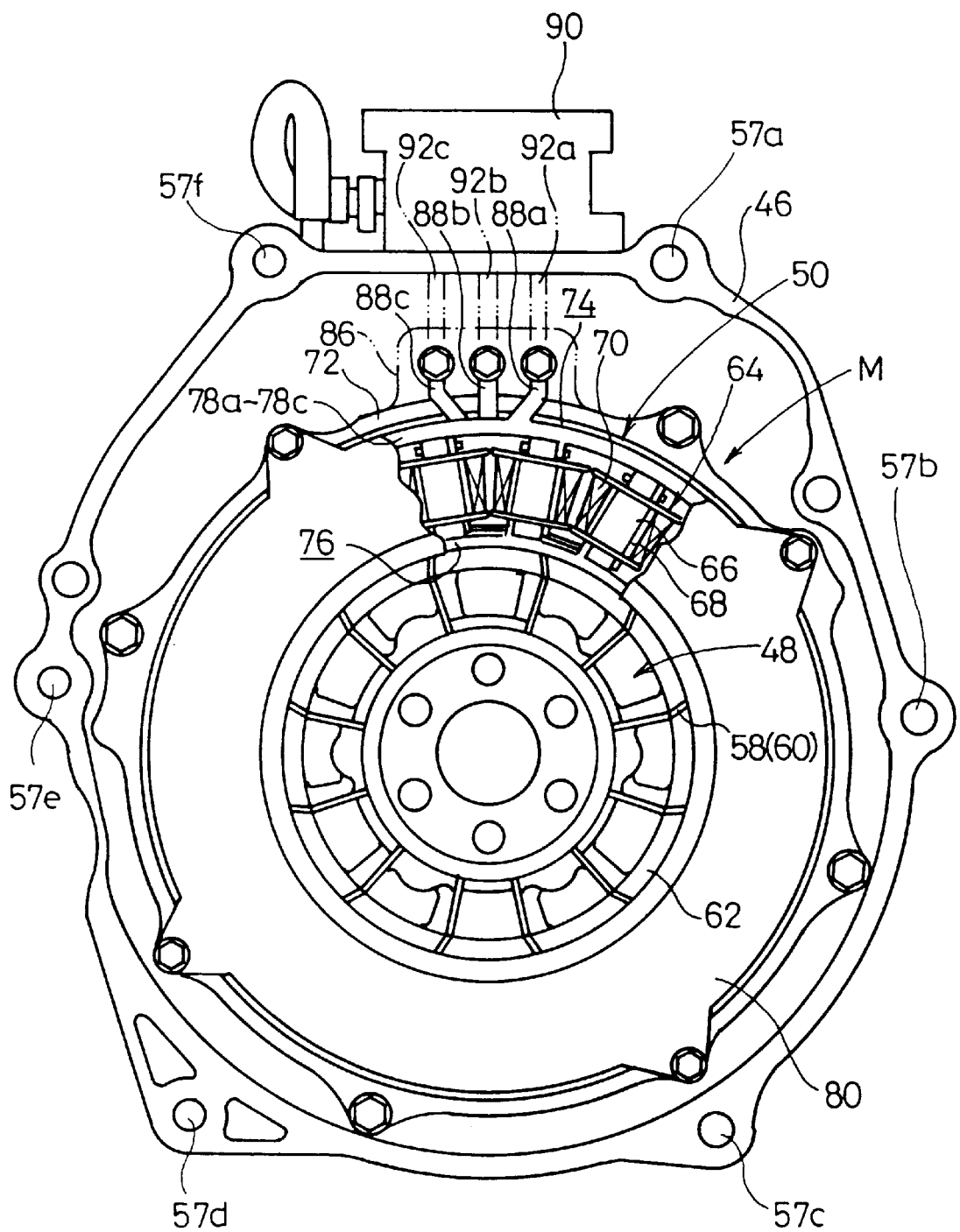
FIG. 9 is an elevational view, partly cut away, of an end of the motor generator as viewed from the internal combustion engine of the hybrid vehicle propulsion apparatus.

FIG. 9 shows an end of the motor generator M as viewed from the internal combustion engine E. As shown in FIG. 9, the housing 46 has a plurality of bolt holes 57a–57f defined in its outer circumferential edge facing the internal combustion engine E. The bolt holes 57a–57f are aligned with the bolt holes 55a–55f, respectively, in the oil pan 22 and the cylinder block 24, so that the mounting bolts B extend through these bolt holes 57a–57f, 55a–55f.

As shown in FIG. 9, the motor generator M comprises a circular rotor 48 and a doughnut-shaped stator 50 disposed around the circular rotor 48. As shown in FIG. 4, the rotor 48 is directly fixed to an end of the crankshaft 28 by a bolt 56. Because the motor generator M is coupled closely to the crankshaft 28, the motor generator M maintains a sufficient level of rigidity. The rotor 48 has a plurality of fins 58, 60 on its opposite end faces, and a plurality of magnets 62, serving as alternate N and S poles, disposed on an outer circumferential surface thereof.

The stator 50 comprises a circular array of coil units 64 (see FIG. 9) each comprising a coil 70 wound around a core 66 made of a plurality of laminated metal sheets and guided by a cross-sectionally channel-shaped guide 68. The stator 50 is fixed to the end surface of the internal combustion engine E by an attachment 72 disposed around the coil units 64.

The guides 68 have circular grooves 74, 76 defined in radially outer and inner regions of the stator 50. Three electrically conductive connection rings 78a, 78b, 78c are stacked and mounted in the groove 74. Each of the connection rings 78a, 78b, 78c has an insulating layer coated on its surface, and is connected to every third coil 70 for energizing the coils 70 with alternating currents in three phases.

A disk-shaped magnetic shield plate 80 is mounted on the end of the stator 50 which faces the internal combustion engine E for preventing magnetic leakage from the motor generator M to the internal combustion engine E. The magnetic shield plate 80 has a connector 86 projecting radially outwardly and supporting three terminals 88a, 88b, 88c projecting radially outwardly from the respective connection rings 78a, 78b, 78c. The terminals 88a, 88b, 88c are connected to respective terminals 92a, 92b, 92c extending from a connector 90 mounted on the housing 40.

A first doughnut-shaped partition 94 fixed to the housing 46 is disposed on a side of the stator 50 which faces the transmission T. The first partition 94 has a radially inner region curved toward the transmission T. The first partition 94 supports a position sensor 96 for detecting the angular position of the rotor 48 with respect to the stator 50.

A disk-shaped flywheel 100 is positioned with respect to the rotor 48 by a positioning pin 99 and fastened to the rotor 48 by a bolt 98 (see FIG. 4) oriented from the transmission T toward the motor generator M. The flywheel 100 has a ring gear 106 on an outer circumferential edge thereof which is held in mesh with a drive gear 104 of the stator motor 102. A drive plate 107 and a second doughnut-shaped partition 108 are fixed to a surface of the flywheel 100 which faces the motor generator M. The second partition 108 has a radially inner region curved toward the first partition 94 and radially overlapping the first partition 94.

The drive plate 107 has a hole (not shown) defined therein in radially aligned relation to the position sensor 96. The angular position of the drive plate 107 which rotates with the rotor 48 can be detected by the position sensor 96 which detects the hole in the drive plate 107. The magnets 62 on the rotor 48 and the hole in the drive plate 107 are positioned relatively to each other by the positioning pin 99 which engages both the rotor 48 and the flywheel 100.

The clutch mechanism C has a friction disk 112 mounted on a surface of the flywheel 100 which faces the transmission T. The friction disk 112 comprises a boss 116 with splines on its inner circumferential surface, a plate 120 extending radially outwardly of the boss 116 through torsion springs 118, and friction plates 112a, 112b joined to respective opposite surfaces of the plate 120.

A pressure plate 124 is positioned on the friction plate 122b of the friction disk 112. A diaphragm spring 130 is held by a wire spring 128 on a housing 126 fixed to the flywheel 100. The diaphragm spring 130 has an outer circumferential region disposed on one side of the pressure plate 124 which faces the transmission T. A piston 132 is disposed on one side of an inner outer circumferential region of the diaphragm spring 130 which faces the transmission T. The piston 132 is disposed around a boss 134 on a transmission case 137 which is positioned coaxially with the boss 116 of the friction disk 112. The piston 132 can be displaced along the boss 134 by a hydraulic mechanism (not shown) to press the diaphragm spring 130. The transmission T has a shaft 136 extending through the bosses 134, 116 and having an end engaging the splines of the boss 116.

The transmission case 137 houses a transmission mechanism of the transmission T. The starter motor 102 is mounted on an outer surface of the transmission case 137. The starter motor 102 is fastened to the cylinder block 24 by mounting bolts B which extend through the transmission case 137 and the housing 46. The transmission case 137, the housing 46, and the internal combustion engine E are fastened together by mounting bolts B extending through the bolt holes 57a–57f shown in FIG. 9.

Operation and advantages of the hybrid vehicle propulsion apparatus thus constructed will be described below.

It is assumed that the hybrid vehicle V is propelled by the internal combustion engine E. When the starter motor 102 is energized, the flywheel 100 is rotated by the drive gear 104 and the ring gear 106, rotating the rotor 48 to crank the internal combustion engine E. Since the starter motor 102 is operatively coupled to the ring gear 106 on the outer circumferential edge of the large-diameter flywheel 100, the starter motor 102 can rotate the crankshaft 28 with a relatively small torque.

Gasoline is supplied from the cylinder head 26 into the cylinders 42a, 42b, 42c and ignited in the cylinders 42a, 42b, 42c to displace the pistons 44a, 44b, 44c in the respective cylinders 42a, 42b, 42c for thereby rotating the crankshaft 28. When rotated, the crankshaft 28 rotates the rotor 48 of the motor generator M and the flywheel 100. The driver of the hybrid vehicle V selects a suitable gear position with the transmission T and makes an action to engage the clutch mechanism C. The piston 132 of the clutch mechanism C is displaced in a direction away from the diaphragm spring 130. The diaphragm spring 130 is displaced to follow the piston 132, causing the outer circumferential edge thereof to press the pressure plate 124. As a result, the friction plates 122a, 122b of the friction disk 112 is sandwiched between the pressure plate 124 and the flywheel 100, whereupon the transmission T and the internal combustion engine E are connected to each other through the rotor 48 of the motor generator M.

When the internal combustion engine E and the transmission T are connected to each other by the clutch mechanism C, propulsive forces from the internal combustion engine E are transmitted from the internal combustion engine E through the transmission T to the drive axle 10 (see FIG. 1), thereby propelling the hybrid vehicle V. Because the rotor 48 of the motor generator M which is relatively heavy is directly coupled to the crankshaft 28, a relatively smooth and stable rotational power flow is transmitted from the internal combustion engine E to the transmission T.

It is now assumed that the hybrid vehicle V is propelled by the motor generator M. The first energy storage unit 13 stores electric energy which has been generated in a regenerative mode by the motor generator M when the internal combustion engine E is decelerated or idles. When the electric energy stored in the first energy storage unit 13 is supplied through the motor drive circuit 12 to the coils 70 of the motor generator M, the coils 70 generates a magnetic field to rotate the rotor 48 and the flywheel 100. The rotation of the flywheel 100 is transmitted as propulsive forces through the clutch mechanism C and the transmission T to the drive axle 10, thereby propelling the hybrid vehicle V. The propulsive forces from the motor generator M can be generated as assistive forces for propulsive forces from the internal combustion engine E at the same time the propulsive forces are produced by the internal combustion engine E.

When the driver makes an action to disengages the clutch mechanism C, the piston 132 is displaced toward the internal combustion engine E, moving the outer circumferential edge of the diaphragm spring 130 away from the pressure plate 124. The friction plates 122a, 122b are released from the gripping action by the pressure plate 124 and the flywheel 100, thus disconnecting the internal combustion engine E or the motor generator M from the transmission T.

FIG. 10 shows a hybrid vehicle propulsion apparatus according to another embodiment of the present invention. The hybrid vehicle propulsion apparatus is designed for use on an automatic-transmission hybrid vehicle. Those parts of the hybrid vehicle propulsion apparatus shown in FIG. 10 which are identical to those shown in FIG. 4 are denoted by identical reference characters, and will not be described in detail below.

A flywheel mechanism F is disposed between the motor generator M and an automatic transmission T'. The flywheel mechanism F is coupled to the rotor 48 of the motor generator M by a joint plate 150 on which a drive plate 152 is mounted. The flywheel mechanism F includes a primary flywheel 156 having a ring gear 154 on its outer circumferential edge and connected to the joint plate 150. The flywheel mechanism F also has a secondary flywheel 158 disposed parallel to the primary flywheel 156. The secondary flywheel 158 has a central boss 160 having splines engaged by the shaft 136 of the transmission T'. The primary flywheel 156 is supported on the boss 160 by a bearing 162, and is connected to the secondary flywheel 158 by torsion springs 164.

The internal combustion engine E and the transmission case 137 of the transmission T' are fastened to each other by mounting bolts extending through the housing 46.

In operation, after the starter motor 102 has cranked the internal combustion engine E, the rotor 48 of the motor generator M rotates to rotate the primary flywheel 156. The rotation of the primary flywheel 156 is transmitted through the torsion springs 164 to the secondary flywheel 158, whose rotation is then transmitted through the shaft 136 to the transmission T'. Depending on the rotational speed of the shaft 136, the transmission T' actuates an automatic transmission mechanism (not shown) thereby to rotate the drive axle 10.

Although certain preferred embodiments of the present invention have been shown and described in detail, it should be understood that various changes and modifications may be made therein without departing from the scope of the appended claims.

What is claimed is:

1. A hybrid vehicle propulsion apparatus on a hybrid vehicle having a transmission and a drive axle coupled thereto, comprising:

an internal combustion engine for generating propulsive forces to be transmitted through the transmission to the drive axle, said internal combustion engine having an output shaft, an oil pan, and a cylinder block;

a motor generator for generating propulsive forces to be transmitted through the transmission to the drive axle, said motor generator being disposed between said internal combustion engine and the transmission and having a rotor directly coupled to said output shaft of the internal combustion engine; and a housing accommodating said motor generator therein, said oil pan and said cylinder block being integrally joined to said housing;

wherein said transmission has a transmission case, and said housing and said transmission case are fastened to said oil pan and said cylinder block by mounting bolts.

2. A hybrid vehicle propulsion apparatus according to claim 1, further comprising a flywheel mechanism, said transmission being connected as an automatic transmission to said motor generator through said flywheel mechanism.

3. A hybrid vehicle propulsion apparatus according to claim 1, wherein said mounting bolts include mounting bolts by which said housing is fastened to said cylinder block.

4. A hybrid vehicle propulsion apparatus according to claim 1, wherein said oil pan and said cylinder block have stiffener ribs disposed on end surfaces thereof which face said housing.

5. A hybrid vehicle propulsion apparatus according to claim 4, wherein said stiffener ribs include arcuate stiffener ribs disposed substantially around an axis of said output shaft and radial stiffener ribs extending radially outwardly from said axis of said output shaft.

6. A hybrid vehicle propulsion apparatus according to claim 1, further comprising a clutch mechanism, said transmission being connected to said motor generator through said clutch mechanism.

7. A hybrid vehicle propulsion apparatus on a hybrid vehicle having a transmission and a drive axle coupled thereto, comprising:

an internal combustion engine for generating propulsive forces to be transmitted through the transmission to the drive axle, said internal combustion engine having an output shaft, an oil pan, and a cylinder block;

a motor generator for generating propulsive forces to be transmitted through the transmission to the drive axle, said motor generator being disposed between said internal combustion engine and the transmission and having a rotor directly coupled to said output shaft of the internal combustion engine;

a housing accommodating said motor generator therein, said oil pan and said cylinder block being integrally joined to said housing; and said oil pan doubles as part of said housing.

8. A hybrid vehicle propulsion apparatus according to claim 7, wherein said oil pan and said cylinder block have stiffener ribs disposed on end surfaces thereof which face said housing.

9. A hybrid vehicle propulsion apparatus according to claim 8, wherein said stiffener ribs include arcuate stiffener ribs disposed substantially around an axis of said output shaft and radial stiffener ribs extending radially outwardly from said axis of said output shaft.

10. A hybrid vehicle propulsion apparatus according to claim 7, further comprising a clutch mechanism, said transmission being connected to said motor generator through said clutch mechanism.

11. A hybrid vehicle propulsion apparatus according to claim 7, further comprising a flywheel mechanism, said transmission being connected as an automatic transmission to said motor generator through said flywheel mechanism.

12. A hybrid vehicle propulsion apparatus on a hybrid vehicle having a transmission and a drive axle coupled thereto, comprising:

an internal combustion engine for generating propulsive forces to be transmitted through the transmission to the drive axle, said internal combustion engine having an output shaft, an oil pan, and a cylinder block;

a motor generator for generating propulsive forces to be transmitted through the transmission to the drive axle, said motor generator being disposed between said internal combustion engine and the transmission and having a rotor directly coupled to said output shaft of the internal combustion engine; and a housing accommodating said motor generator therein, said oil pan and said cylinder block being integrally joined to said housing;

said oil pan having an end portion expanded outwardly from near a region where an oil filter is mounted on the oil pan, and coupled to said housing.

13. A hybrid vehicle propulsion apparatus according to claim 12, wherein said oil pan and said cylinder block have stiffener ribs disposed on end surfaces thereof which face said housing.

14. A hybrid vehicle propulsion apparatus according to claim 13, wherein said stiffener ribs include arcuate stiffener ribs disposed substantially around an axis of said output shaft and radial stiffener ribs extending radially outwardly from said axis of said output shaft.

15. A hybrid vehicle propulsion apparatus according to claim 12, further comprising a clutch mechanism, said transmission being connected to said motor generator through said clutch mechanism.

16. A hybrid vehicle propulsion apparatus according to claim 12, further comprising a flywheel mechanism, said transmission being connected as an automatic transmission to said motor generator through said flywheel mechanism.

* * * * *